United States Patent

Baba

[11] Patent Number: 5,938,578
[45] Date of Patent: Aug. 17, 1999

[54] FINGER OPENING AND CLOSING MECHANISM FOR TOOL EXCHANGING DEVICE

[75] Inventor: Haruki Baba, Ichinomiya, Japan

[73] Assignee: Brother Kogyo Kabushiki Kaisha, Nagoya, Japan

[21] Appl. No.: 08/911,016

[22] Filed: Aug. 14, 1997

[30] Foreign Application Priority Data

Nov. 19, 1996 [JP] Japan ................................. 8-308346

[51] Int. Cl.$^6$ ................................................. B23Q 3/157
[52] U.S. Cl. ............................... 483/39; 483/38; 483/902
[58] Field of Search .................................. 483/31, 41, 44, 483/49, 902, 42, 38, 39; 294/115, 116, 87.2, 87.22, 87.24; 414/736

[56] References Cited

U.S. PATENT DOCUMENTS

| | | | |
|---|---|---|---|
| 4,091,526 | 5/1978 | Nakaso | 483/90 R X |
| 4,833,772 | 5/1989 | Kobayashi et al. | 483/44 |
| 5,081,762 | 1/1992 | Kin | 483/44 |
| 5,620,406 | 4/1997 | Bae | 483/39 |

FOREIGN PATENT DOCUMENTS

| | | | |
|---|---|---|---|
| 53-87079 | 8/1978 | Japan | 483/902 |
| 56-134147 | 10/1981 | Japan | 483/902 |
| 63-123646 | 5/1988 | Japan . | |
| 1-51247 | 2/1989 | Japan | 483/902 |
| 3-92238 | 4/1991 | Japan . | |
| 1815122 | 5/1993 | U.S.S.R. | 483/38 |
| 2198375 | 6/1988 | United Kingdom | 483/902 |

*Primary Examiner*—William Briggs
*Attorney, Agent, or Firm*—Oliff & Berridge, PLC

[57] ABSTRACT

An outer shaft gear installed at an external side of a pivoting shaft for pivoting a tool exchange arm main body is fitted to a finger driving cam shaft, a driving force from an ATC drive shaft is transmitted via the outer shaft gear to a finger driving cam installed to the finger driving cam shaft, and a driven portion in contact with the finger driving cam is operated by which fingers FA and FB at front ends of pairs of fingers are opened. When the fingers FA and FB are not pressed by the operation of the finger driving cam, the fingers FA and FB are closed by urging forces of springs.

14 Claims, 7 Drawing Sheets

FINGER OPENING AND CLOSING MECHANISM FOR TOOL EXCHANGING DEVICE

BACKGROUND OF THE INVENTION

1. Field of the Invention

The present invention relates to a finger opening and closing mechanism for a tool exchanging device of a machine tool, particularly to a finger opening and closing mechanism for a tool exchanging device of a machine tool for exchanging tools set to a spindle and a tool magazine of a machine tool.

2. Description of Related Art

There has been conventionally known a machine tool capable of exchanging tools between a spindle and a tool magazine. According to the machine tool, a finger opening and closing mechanism of a tool exchanging device for exchanging tools is installed, tools respectively set to a spindle and a tool magazine are grasped by pairs of fingers installed to a main body thereof, and positions of the tools are changed and tools are exchanged by pivoting a tool exchange arm.

There has been known a finger opening and closing mechanism of this kind disclosed in JP-A-3-92238 and U.S. Pat. No. 4,883,772 where a center shaft mounted with finger driving cams is separately installed at the inside of a hollow pivoting shaft for pivoting a tool exchange arm, which has a comparatively simple constitution and which accurately regulates motion of fingers, whereby pairs of fingers are opened and closed by pivoting the center shaft by a predetermined angle.

FIG. 1 shows a conventional finger opening and closing mechanism When a tool exchange device drive shaft (hereinafter, referred to as an ATC drive shaft) 118 is driven to rotate by a tool exchange drive motor 115, a rotational motion of a cylindrical groove cam 123 provided on the ATC drive shaft 118 is converted into a vertical reciprocal motion of a cylindrical member 136 via a pivoting lever 140 whereby a tool exchange arm main body 116 is vertically reciprocated along with a hollow spindle 125 fitted to the cylindrical member 136.

Further, rotation of parallel cams 121 provided on the lower portion of the ATC drive shaft 118 is converted into pivoting of a spline sub shaft 137 via follower rollers 138 whereby the hollow spindle 125 in mesh with the spline sub shaft 137 is pivoted thereby pivoting the tool exchange arm main body 116.

Meanwhile, rotation of a plane groove cam 124 installed at the highest position of the ATC drive shaft 118 converted into pivoting of a segment gear 134 via a pivoter 135 whereby an arm center shaft 131 fixedly fitted to a support member 129 in mesh with the segment gear 134 is pivoted. At this moment, a hollow cam shaft 151 fitted to the arm center shaft 131 at the lower portion of the arm center shaft 131 is pivoted, and the pivoting force is transmitted to driven portions 117C of pairs of fingers 117 whereby gripper jaws or claw portions at front ends of the pairs of fingers 117 are opened and closed.

However, according to such a finger opening and closing mechanism, the pivoting shaft must be fabricated in a hollow shape and accordingly, the fabrication cost is increased. Further, the center shaft for opening and closing the claw portions at the front ends of the pairs of fingers requires a slender shape since it is incorporated at the inside of the pivoting shaft. Accordingly, strength of the shaft in respect of torsion is small, and it is conceivable that even if a pivoting angle of the center shaft is set, the opening and closing angle of the claw portions at the front ends of the pairs of fingers is not brought into a predetermined value. Therefore, the center shaft needs to be pivoted excessively in consideration of the torsion.

Also, the life of the center shaft may be shortened by the torsion and so on. A large plane pressure may be applied since the diameter fitted thereto is small and a large torque cannot be obtained.

SUMMARY OF THE INVENTION

An object of the present invention is to provide a finger opening and closing mechanism resolving the above-described problems and having a strength in respect of torsion larger than that in the conventional case and capable of conducting large torque transmission.

In order to solve the above-described problem, according to an aspect of the present invention, there is provided a finger opening and closing mechanism of a tool exchange device of a machine tool where a plurality of sets of pairs of fingers are mounted to a tool exchange arm main body having a pivoting shaft on a first axial line, biasing structure for biasing claw portions at front ends of the pairs of fingers in a direction of closing or opening the claw portions are mounted to the respective pairs of fingers, finger driving cams for reciprocally pivoting by a predetermined angle around the first axial line are installed, driven portions for being pivoted in a direction of opening the fingers or closing the fingers against urging forces of the biasing structure by receiving the operation of the cams are installed to the pairs of fingers, a drive force from an ATC drive shaft is transmitted to the tool exchange arm and the pairs of fingers, and tools set to a spindle and a tool magazine of the machine tool are exchanged by utilizing grasping operation by the pairs of fingers and pivoting operation of the tool exchange arm main body, wherein the finger driving cams are arranged at a finger driving cam shaft for reciprocally pivoting by a predetermined angle on the first axial line, and wherein a lower end of a hollow outer shaft gear arranged at an external side of the pivoting shaft of the tool exchange arm main body is fitted to an upper end of the cam shaft by which the drive force from the ATC drive shaft is transmitted to the cam shaft via the outer shaft gear.

Further, the finger opening and closing mechanism may be featured in that the length of the outer shaft gear in the axial direction is shortened by arranging the drive force transmitting portion of the ATC drive shaft and the outer shaft gear adjacent the tool exchange arm main body.

According to the finger opening and closing mechanism of the present invention, the outer shaft gear for opening and closing the claw portions at the front ends of the pairs of fingers of the conventional tool exchange device is installed at the external side of the pivoting shaft of the tool exchange arm main body. Accordingly, the diameter of the outer shaft gear is increased and the length in the axial direction is shortened. Therefore, the strength in respect of torsion is large, and excessive pivoting operation is not needed. Therefore, the tool exchange time can be shortened. Further, the fitted diameter is large, and therefore, plane pressure is reduced and a large torque is obtained.

BRIEF DESCRIPTION OF THE DRAWINGS

Preferred embodiments of the present invention will be described in detail with reference to the following FIGS. wherein.

DETAILED DESCRIPTION OF PREFERRED EMBODIMENTS

An explanation will be given of preferred embodiments of the present invention in reference to the drawings to further clarify the embodiments of the present invention. Incidentally, embodiments of the present invention are not limited to the following embodiments at all but the present invention can naturally be implemented by various embodiments so far as they pertain to the technical scope of the present invention.

Firstly, an explanation will be given of the basic architecture of a machining center where a tool exchange device TC of an embodiment is mounted.

Figure 1:
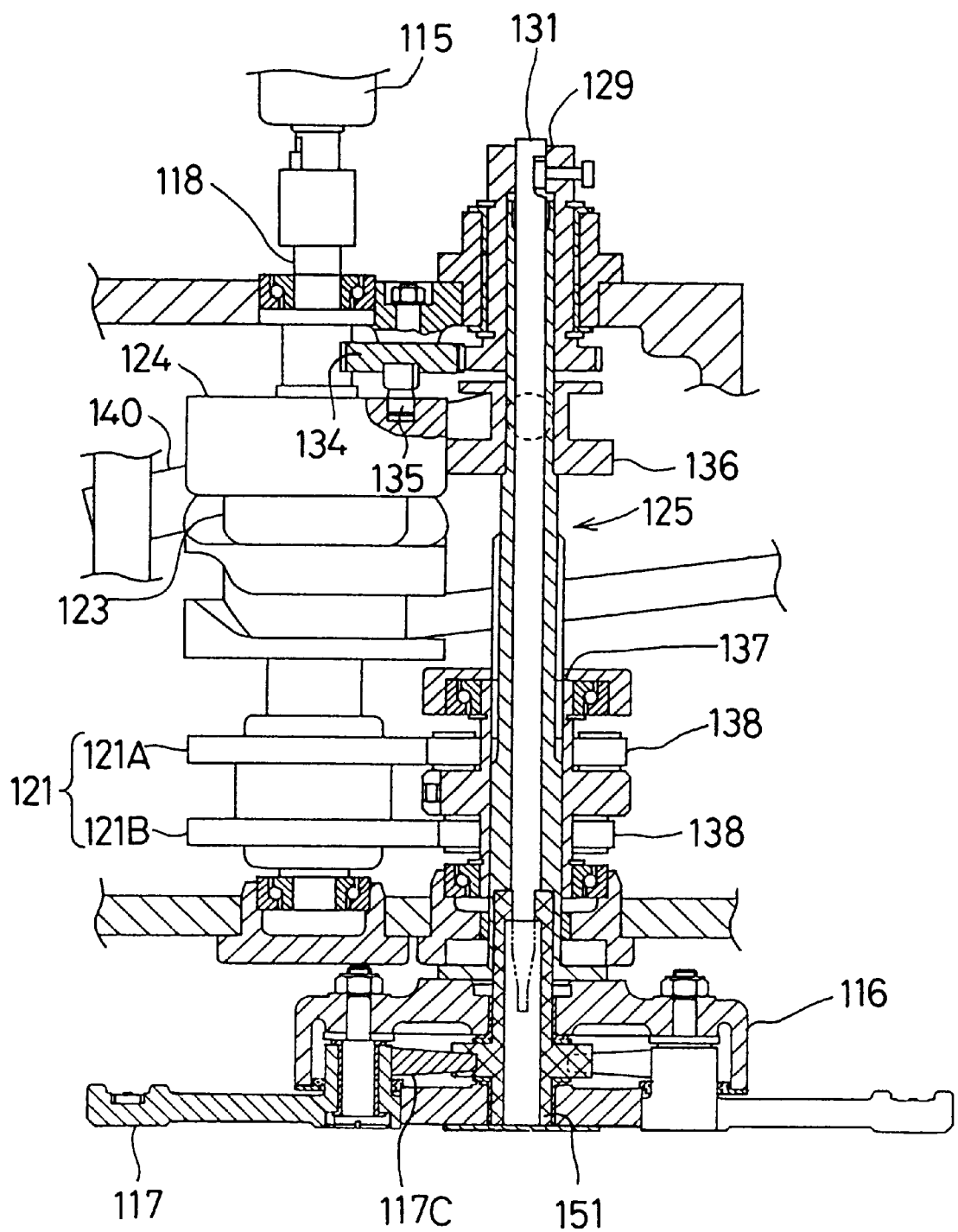
FIG. 1 is a vertical sectional view of a Related Art tool exchange device.
Figure 2:
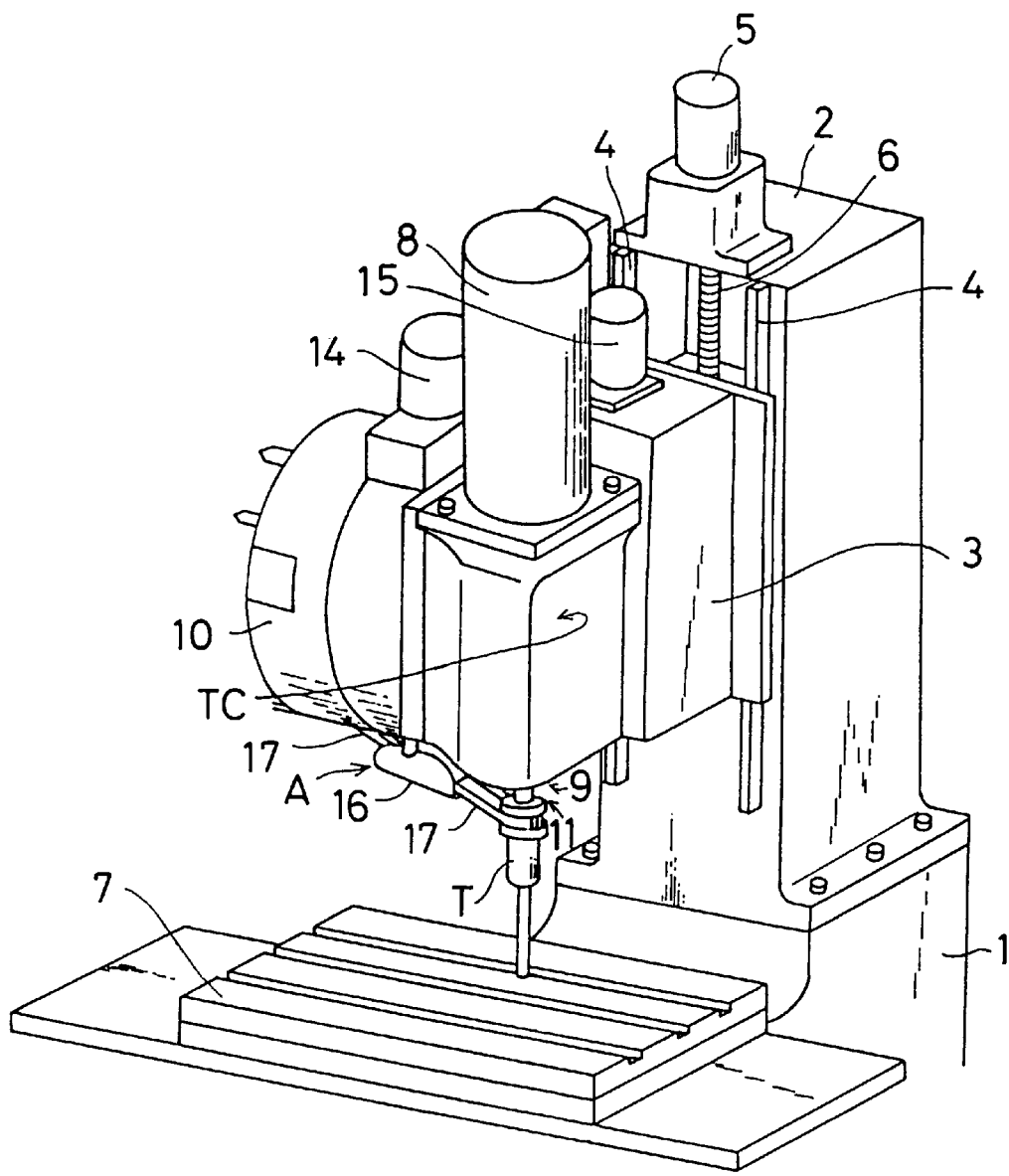
FIG. 2 is a perspective view of a tool exchange device according to one embodiment of the present invention.

As shown in FIG. 2, according to the machining center, a head stock 3 is supported by a column 2 which is erected on and fixed to a base 1. The head stock 3 is guided by a linear guide 4 and is moved in the up and down direction by a Z-axis feed motor 5 and a feed screw 6. A table 7 installed on the base 1 is movable in directions on a horizontal plane. A spindle motor 8, a spindle 9 and a rotary type tool magazine 10 are mounted to the head stock 3. Incidentally, the spindle 9 and the tool magazine 10 are similar to a spindle and a tool magazine disclosed in JP-A-63-123646 or U.S. Pat. No. 4,833,772, incorporated herein by reference.

The spindle 9 is provided with a tool attaching portion 11 capable of detachably holding a tool T and a tool release pin (not shown) for detaching the tool T by connecting the release pin to the tool attaching portion 11 via a drawbar (not shown) and by pushing the release pin down.

The tool magazine 10 is provided with a plurality of hold ports for detachably holding the tools T, which are normally poised at a horizontal attitude, at a surrounding portion of a rotating disk. Only a hold port disposed at the lowest position is rotated downwardly by 90 degrees whereby it is poised in a vertical attitude whereby a state capable of exchanging tools is created by a tool exchange device TC according to the embodiment. Selection of the tool T (arrangement to the lowest position) is conducted by rotating a magazine motor 14.

Further, a tool exchange device TC of this embodiment for exchanging the tools T between the tool magazine 10 and the spindle 9 is integrated to the head stock 3. The tool exchange device TC is constituted by a tool exchange drive motor 15, a tool exchange arm A and the like.

The tool exchange arm A of the embodiment is mainly constituted by a tool exchange arm main body 16 (hereinafter, simply referred to as "arm main body") and two sets of pairs of fingers 17 which are openable and closable and which extend outwardly from the arm main body 16 at positions symmetrical with each other with respect to a center axis thereof. The tools T set to the spindle 9 and the tool magazine 10 are exchanged by utilizing the grasping operation of the pairs of fingers 17 and the pivoting operation and the up and down motion of the arm main body 16.

Figure 3:
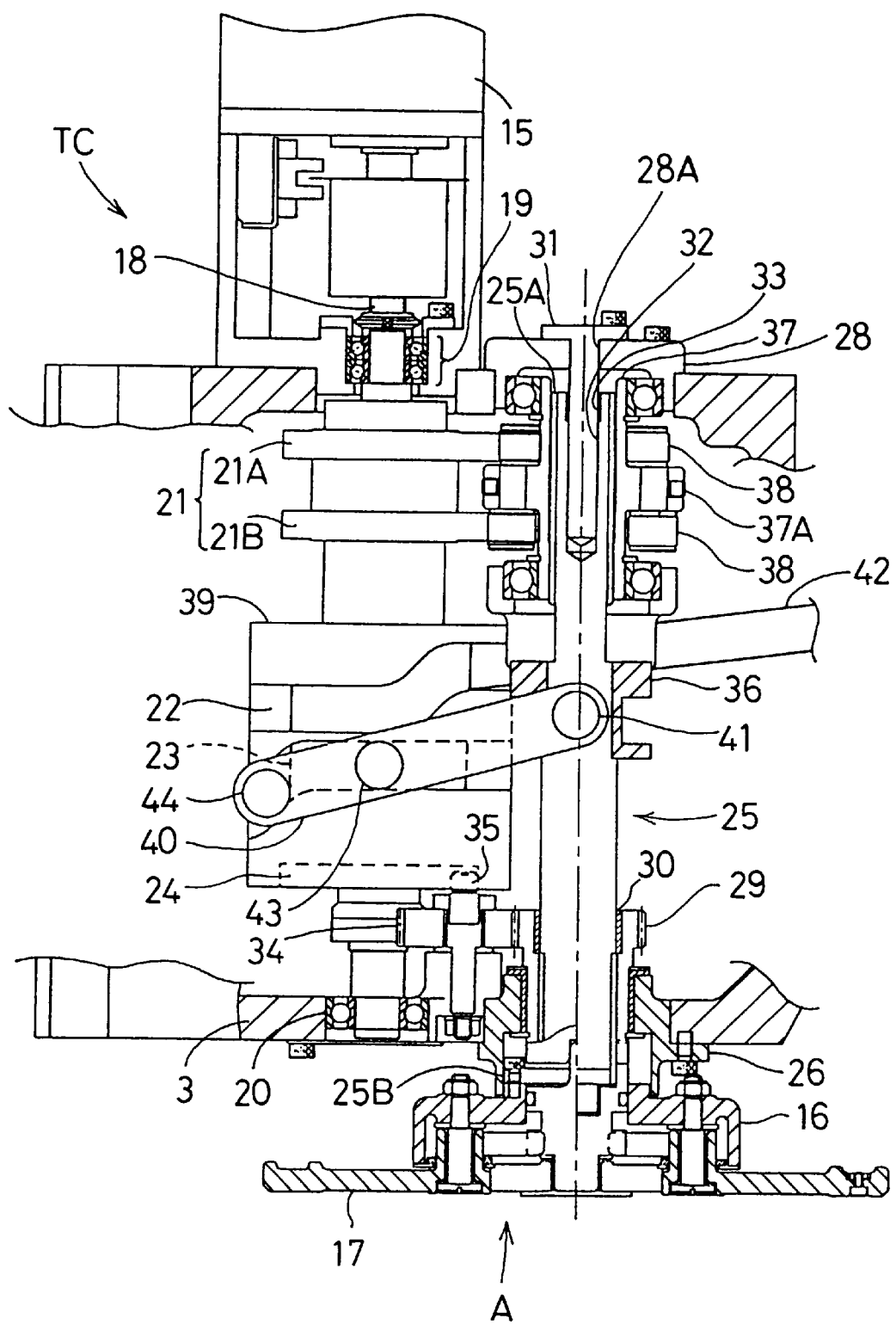
FIG. 3 is a vertical sectional view of the tool exchange device according to the present invention.
Figure 4:
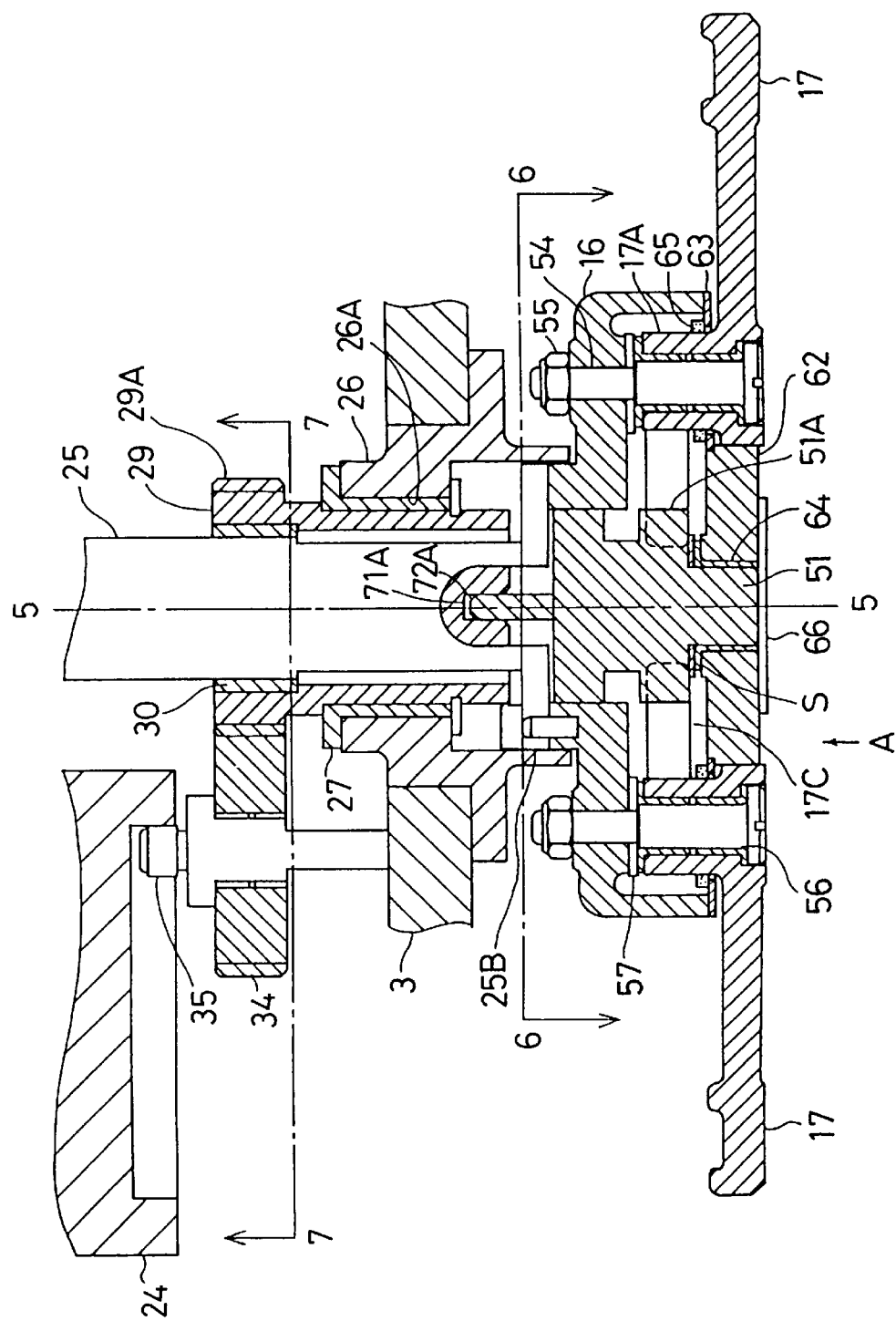
FIG. 4 is a sectional view of a lower portion of a finger opening and closing mechanism according to the present invention.

FIG. 3 shows the total construction of the tool exchange device TC causing the motion of the tool exchange arm A, and FIG. 4 shows a sectional view at a lower portion of a finger opening and closing mechanism corresponding to other portions of the present invention.

As shown in FIG. 3, an ATC drive shaft 18 of the tool exchange device TC is coupled to the tool exchange drive motor 15. The ATC drive shaft 18 is arranged in the vertical direction and is rotatably supported by the head stock 3 via bearings 19 and 20. Four cams 21, 22, 23 and 24 are installed to the ATC drive shaft 18.

Meanwhile, a pivoting shaft 25 is vertically arranged at the side of the ATC drive shaft 18. A spline 25A is provided at the upper portion of the pivoting shaft 25, a flange 25B is provided at a lowest end thereof, and an arm main body 16 is fixed to the flange 25B.

A stepped hole 32 having a predetermined depth is opened at the upper end of the pivoting shaft 25 along the axial center of the pivoting shaft 25, and a supporting member 31 in a shape of a long shaft having an outer diameter smaller than an inner diameter of the stepped hole 32 is inserted into a through hole 28A located at an upper machining frame 28 of the head stock 3. The supporting member 31 is fixed to the upper machine frame 28 and is inserted into the stepped hole 32 via a bush 33 arranged at an upper stage of the stepped hole 32 whereby the upper portion of the pivoting shaft 25 is axially supported.

Meanwhile, as shown in FIG. 4, the lower end of the pivoting shaft 25 penetrates an outer shaft gear 29 in a substantially cylindrical shape having a hole diameter larger than the diameter of the pivoting shaft 25 and is supported by the outer shaft gear 29 via a bush 30 such that it can be pivoted around the center shaft and reciprocated in the axial direction.

A hole 26A is installed at a lower machine frame 26 of the head stock 3, the outer shaft gear 29 penetrates the hole 26A via a bush 27 and is supported such that it can be pivoted around the center axis independently from the pivoting of the pivoting shaft 25.

Further, as shown in FIG. 3, the pivoting shaft 25 is provided with a cylindrical member 36 having a cylindrical groove that is fixed at a vicinity of the central portion in the up and down direction, and the pivoting shaft 25 is vertically reciprocated by moving the cylindrical member 36 upwardly and downwardly. Furthermore, the pivoting shaft 25 is rotated in accordance with rotation of a spline sub shaft 37 fitted to the spline 25A at the upper portion around the shaft. Incidentally, shafts of follower rollers 38 that follow the cams 21 are fixed at upper and lower faces of the flange portion 37A that is formed at the outer periphery of the spline sub shaft 37.

As shown in FIG. 4, a gear 29A is cut at the outer periphery of the upper end portion of the outer shaft gear 29, and the gear 29A meshes with a segment gear 34 at the side. The segment gear 34 is fixed with a pivoter 35, and the pivoter 35 follows the cam 24. Further, the outer shaft gear 29 is fitted to a finger driving cam shaft 51 at the lower portion in the axial direction.

Figure 5:
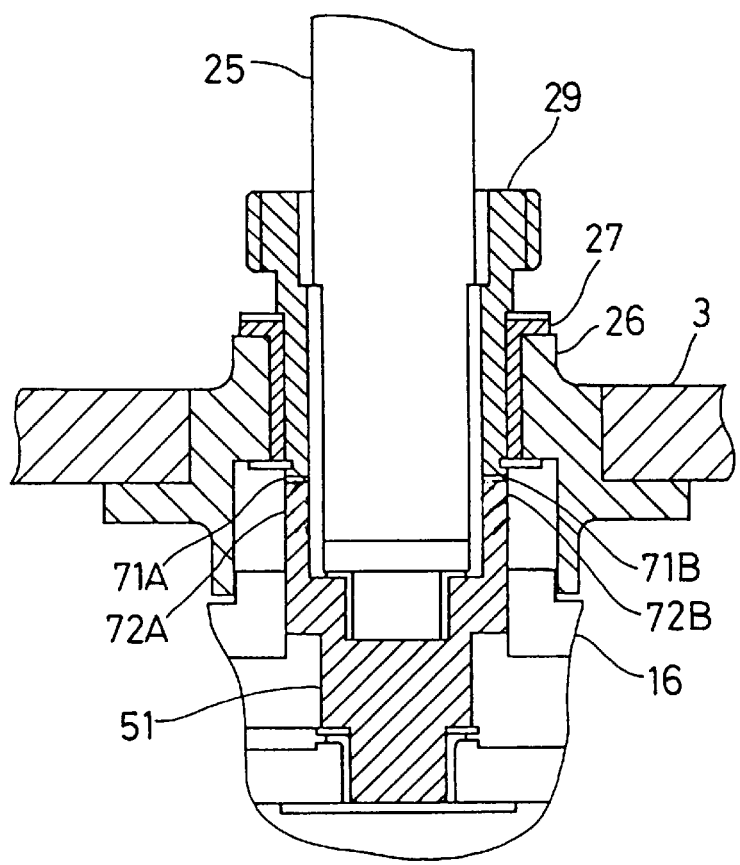
FIG. 5 is a sectional view taken from a line 5—5 of FIG. 4 showing a fitted portion of an outer shaft gear and a finger driving cam shaft according to the present invention.

FIG. 5 shows a section taken from a line 5—5 in FIG. 4, that is, a section showing a fitted portion of the outer shaft gear 29 and the finger driving cam shaft 51.

Recesses 71A and 71B where the lower portions are opened are installed at two locations of the lower end portion of the cylindrical outer shaft gear 29 which are remote from each other by 180 degrees, whereas projections 72A and 72B projecting upwardly are opposedly installed at two locations of the upper end portion of the finger driving cam shaft 51, and the respective recesses are fitted to the respective projections. (refer to FIG. 4)

Figure 6:
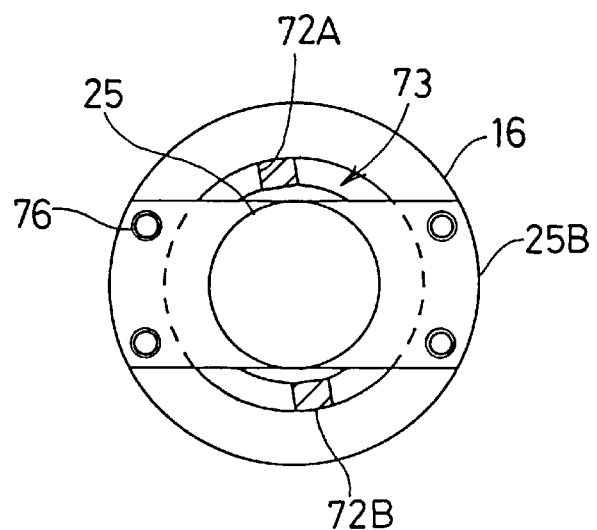
FIG. 6 is a sectional view taken from a line 6—6 of FIG. 4.

FIG. 6 is a view showing a section taken from a line 6—6 of FIG. 4. As shown in FIG. 4 and FIG. 6, the flange 25B for connecting the pivoting shaft 25 and the arm main body 16 is provided with a shape where opposed portions of a circular disk are cut off in parallel (FIG. 6), and the central portion of the upper face is coupled to the lower face of the pivoting shaft 25. Further, with respect to the flange 25B, the lower faces of two circular arc portions are coupled to the upper face of the arm main body 16 with pins 76. The projections 72A and 72B are fitted to the recesses 71A and 71B at positions slightly remote upwardly from the upper face of the flange 25B. As described below, the rotational motion of the pivoting shaft 25 and the arm main body 16 is carried out in a state where the pivoting shaft 25 and the arm main body 16 are moved downwardly whereby the fitting at the fitted portions is released, and the rotational motion of the outer shaft gear 29 and the finger driving cam shaft 51 is carried out in a state where the pivoting shaft 25 and the arm main body 16 are pulled up in the upward direction and the outer shaft gear 29 and the finger driving cam shaft 51 are fitted to each other at the fitted portions. At this moment, the fitted portions are only rotated by a predetermined angle in a space 73 at the side portion of the flange 25B. Accordingly, the pivoting is not hindered by the flange 25B.

Figure 8:
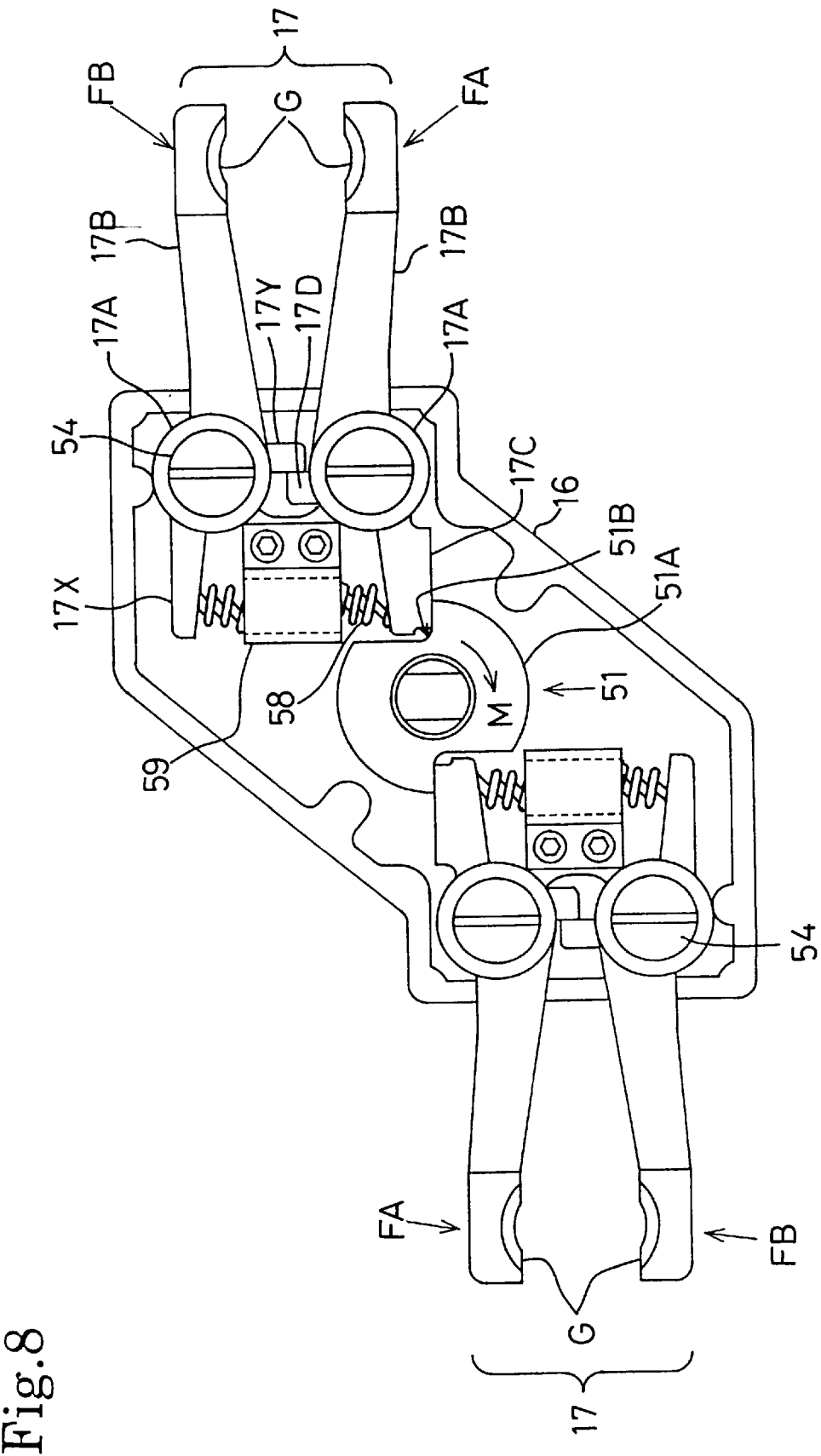
FIG. 8 is a view viewing from below a tool exchange arm according to the present invention.

FIG. 8 shows a view viewing from below the tool exchange arm A of the embodiment. As shown in FIG. 4 and FIG. 8, the arm main body 16 of the tool exchange arm A is symmetrical with respect to the finger driving cam shaft 51 which penetrates through a center hole thereof and is pivoted in the center hole independently from the arm main body 16.

The finger driving cam shaft 51 is integrally provided with a finger driving cam 51A in a shape of a flange that is brought into contact with a spacer S (FIG. 4) extending in the horizontal direction, at a vicinity of the central portion in the vertical direction. When the finger driving cam 51A is viewed from below (refer to FIG. 8), it has a shape where two portions of a circle at symmetrical positions are cut off. The two cut-off portions 51B are in the same shape.

Two sets of pairs of through holes (refer to FIG. 4) are perforated at the upper face of the arm main body 16 symmetrically in respect of the finger driving cam shaft 51. Two sets of the pairs of fingers 17 having the same construction are supported by the arm main body by bolts 54 and nuts 55.

As shown in FIG. 8, a finger FA of each of the pairs of fingers 17 on the side near to the finger driving cam shaft 51 is integrally formed by a cylindrical portion 17A where the bolt 54 is inserted through a finger main body portion 17B extending therefrom to the external side of the arm main body 16 and having a gripper jaw or grasping claw G at a front end thereof. The finger FA also includes a driven portion 17C extending from the cylindrical portion 17A in a direction substantially opposed to the finger main body portion 17B and a projecting portion 17D projecting substantially vertically to the finger main body portion 17B and the driven portion 17C. The other finger FB is substantially symmetrical with the finger FA. However, the difference therebetween resides in that a corresponding driving portion 17X corresponding to the driven portion 17C is slightly smaller than the driven portion 17C, and the position of a projecting portion 17Y (hereinafter, referred to as an engaging portion) corresponding to the projecting portion 17D is different from that of the projecting portion 17D.

The respective fingers FA and FB are brought into a state where they are pivotable around axial lines (second axial lines) in parallel to an axial line (first axial line) of the finger driving cam shaft 51 of the tool exchange arm A, the projecting portion 17D and the engaging portion 17Y are brought into a state where they are opposed to each other, and the driven portion 17C of the finger FA is arranged in the cut-off portion 51B. Incidentally, the above-described supporting is conducted in a state where a bush 56 is interposed between the inner face of the cylindrical portion 17A and the external face of the bolt 54, and a wheel ring 57 is interposed between the arm main body 16 and the upper end face of the cylindrical portion 17A (refer to FIG. 4).

A spring 58 is set to the arm main body 16 by a spring holder 59 disposed between the driven portion 17C and the corresponding driving portion 17X of the respective fingers.

The spring 58 is urged in a direction of opening (direction to an external side) the driven portion 17C and the corresponding driven portion 17X. Therefore, both of the finger main body portions 17B of the pair of fingers 17 are urged in the closing direction with the fixed cylindrical portions 17A as fulcrums. However, with respect to the finger FA, the driven portion 17C is brought into contact with the finger driving cam 51A and is brought into a state where it is prevented from closing by a constant amount or more. Meanwhile, with respect to the finger FB, the engaging portion 17Y meshes with the projecting portion 17D of the finger FA and therefore, it is prevented from closing by a certain degree or more.

When the driven portion 17C is pressed against the urging force of the spring 58, the finger FA is pivoted to open with the cylindrical portion 17A as a fulcrum, and the finger FB is pivoted to open since the engaging portion 17Y is pressed by the projecting portion 17D. The opening of the pair of fingers 17 is conducted by applying a pressing force to the driven portion 17C by the finger driving cam 51A through pivoting the finger driving cam 51A around a central axis by a predetermined angle.

Further, as is apparent from FIG. 4, the tool exchange arm A is provided with a center shaft holder 62 and an arm main body holder 63 and the like. The lower portion of the finger driving cam shaft 51 is inserted into a center hole of the center shaft holder 62 via a bush 64, and the cylindrical portion 17A is inserted into a hole of the arm main body holder 63 coupled to the arm main body 16. According to the center shaft holder 62 and the arm main body holder 63, drive mechanisms (springs 58 or the like) of the pairs of fingers 17 are incorporated in a space surrounded by the center shaft holder 62, the arm main body holder 63 and the arm main body 16. Sealing members 65 of rubber are arranged for closing gaps between the cylindrical portions 17A of the respective fingers FA and FB and the holes of the arm main body holder 63 inserted therewith. In this way, the space including the drive portion of the tool exchange arm A is tightly enclosed. Incidentally, the finger driving cam shaft holder 62 is bonded to and supported by the arm main body holder 63. Further, the center hole of the finger driving cam shaft holder 62 is closed by a circular disk 66 bonded at the surrounding.

As described above, the total construction of the tool exchange device has been described and an explanation will be given of the motion of the tool exchange device TC of the embodiment.

In exchanging tools, the pairs of fingers 17 grasp respectively the used tool T mounted to the spindle 9 and the new tool T set to the magazine 10 (refer to FIG. 2). When the grasping operation is completed, the tool exchange arm A is lowered and pivoted by 180 degrees whereby the positions of the tools are exchanged. Thereafter, the tool exchange arm A is elevated, the new tool T is mounted to the spindle 9 and thereafter, the grasping of the tool T is released and the used tool T is stored in the magazine 10.

An explanation will be given of the operation of the respective steps in reference to FIG. 3 and FIG. 4.

As mentioned above, the tool exchange arm A is reciprocated in an axial direction of the pivoting shaft 25. This is for drawing or clamping the tool T from the head stock 9 or the tool magazine 10. The cylindrical groove cam 23 formed at the upper portion on the peripheral face of the cylindrical member 39 around the ATC drive shaft 18 controls this motion. A pivoting lever 40 pivoting with a support point 44 as a fulcrum is engaged with the cylindrical groove cam 23 via an engager 43 installed at a vicinity of the central portion, and a contacter 41 installed at the front end of the pivoting lever 40 is engaged with a circular groove of the cylindrical member 36 fixed to the pivoting shaft 25. Therefore, when the ATC drive shaft 18 is rotated by one rotation, the pivoting lever 40 is pivoted whereby the pivoting shaft 25 and the tool exchange arm A fixed thereto are reciprocated by one reciprocation in the axial direction. According to FIG. 3, the engagement relationship between the contacter 41 and the cylindrical member 36 is conceptually shown.

Further, as shown in FIG. 3, the tool exchange device TC of the embodiment is provided with a mechanism for drawing the used tool T from the spindle 9. That is, the cylindrical groove cam 22 is formed at the upper portion of the peripheral face of the cylindrical member 39 on the external side of the ATC drive shaft 18. When the tool T is drawn from the spindle 9, the tool T can be detached by pressing and pushing down a tool release pin (not shown) connected to a drawbar (not shown) of a tool detachment device of the spindle 9 by a pivoting member 42 that is pivoted by following the cylindrical groove cam 22.

Further, the tool exchange arm A is pivoted in the horizontal direction. This is for exchanging the tools T of the spindle 9 and the tool magazine 10. The parallel cams 21 installed at the highest portion of the ATC drive shaft 18 control this motion. The motion thereby is similar to that in a corresponding portion of a device disclosed in JP-A-63-123646 and U.S. Pat. No. 4,833,772 and accordingly, a simple explanation will be given. The parallel cams 21 constitute a composite cam comprising two sheets of plate cams 21A and 21B that are brought into contact with the follower rollers 38 that follow the spline sub shaft 37. Based on this construction, during one rotation of the ATC drive shaft 18, the spline sub shaft 37, the pivoting shaft 25 and the tool exchange arm A are rotated by 180 degrees.

Further, the pairs of fingers 17 of the tool exchange arm A are opened and closed. The plane groove cam 24 at the lower face of the cylindrical member 39 around the ATC drive shaft 18 controls this motion.

Figure 7:
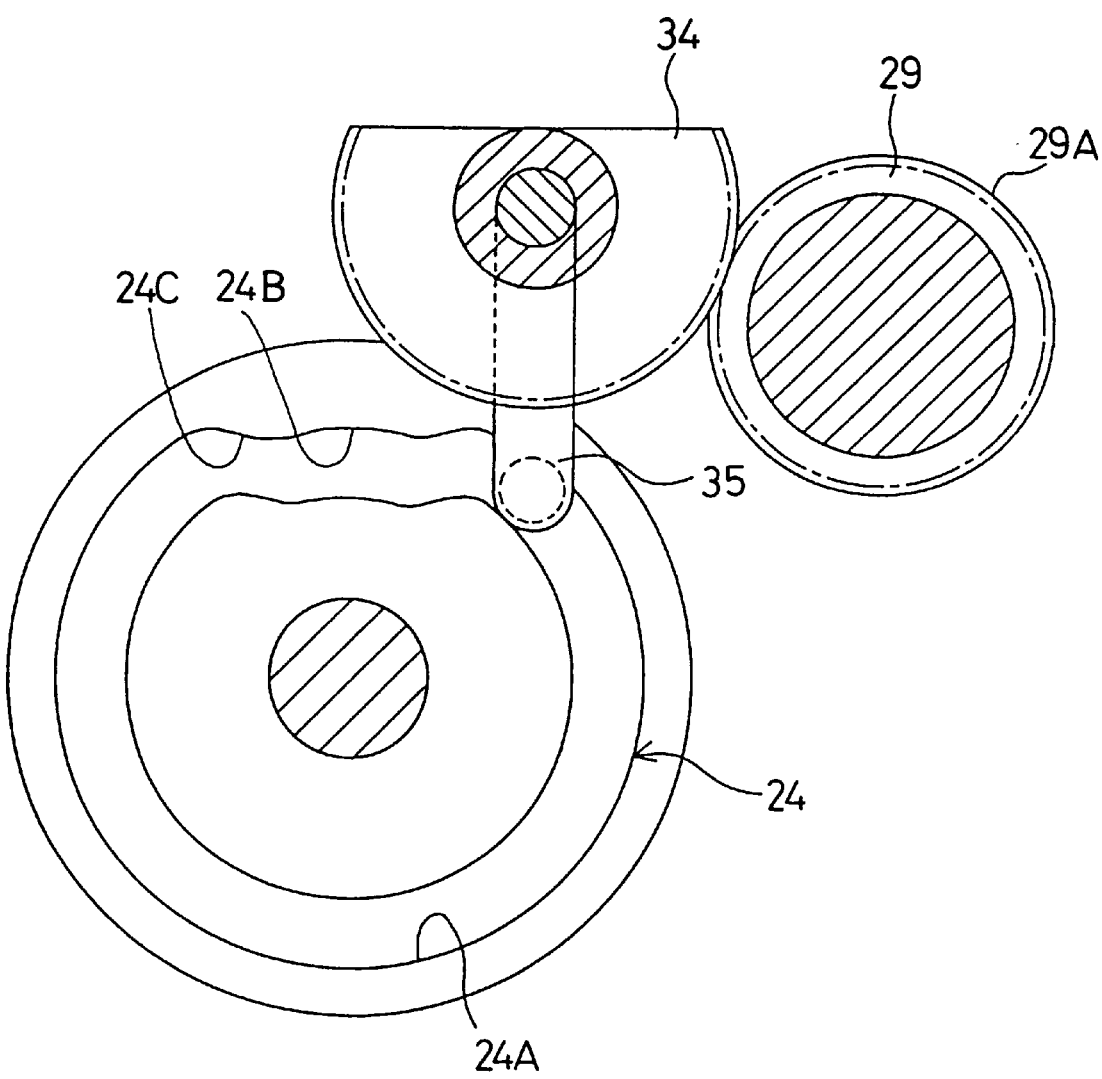
FIG. 7 is a sectional view taken from a line 7—7 of FIG. 4.

FIG. 7 shows a sectional view taken from a line 7—7 of FIG. 4. As illustrated, a groove of the plane groove cam 24 is provided with a shape of a closed ring and is provided with a large diameter portion 24A and a small diameter portion 24B in circular arc shapes centered on the cam shaft and connecting portions 24C connecting portions 24A and 24B. The pairs of fingers 17 are brought into a closed state, an opened state and an opening and closing state depending on where the pivoter 35 is integrated to either of the large diameter portion 24A, the small diameter portion 24B and the connecting portions 24C of the rotating plane groove cam 24.

That is, when the ATC drive shaft 18 is rotated and reaches a predetermined angle, during a time period where the pivoter 35 is detached from the large diameter portion 24A of the plane groove cam 24 and the pivoter 35 passes through the connecting portion 24C from the large diameter portion 24A to the small diameter portion 24B, the pivoter 35 is pivoted in one direction centering on the shaft of the segment gear 34. Further, during a time period where the pivoter 35 is detached from the small diameter portion 24B and passes through the connecting portion 24C from the small diameter portion 24B to the large diameter portion 24A, the pivoter 35 is pivoted in a direction reverse to the above-described direction.

By pivoting the pivoter 35, the segment gear 34 following the pivoter 35 is pivoted and accordingly, the outer shaft gear 29 in mesh with the segment gear 34 via a gear 29a is pivoted. By pivoting the outer shaft gear 29, the finger driving cam shaft 51 of the tool exchange arm A in mesh therewith also starts pivoting. Then, the finger driving cam 51A at the external side of the finger driving cam shaft 51 starts rotating in a direction of an arrow mark M of FIG. 8, in a direction where the finger FA is not pressed. Therefore, the finger FA starts closing by the urging force of the spring 58. Further, the finger FA is opened by reversing the above procedure.

Although an explanation has been given of embodiments of the present invention as described above, the present invention is not limited to the embodiments at all, but the present invention may have a construction where a spring is installed between each pair of fingers to urge open claw portions at front ends thereof, and the respective pair of fingers is moved in the closing direction by operating the finger driving cam on the driven portion. Further, although a motor is used as a drive source, a rotary cylinder, a rack and pinion mechanism or the like may be used. Furthermore, although according to embodiments the outer shaft gear is operated by the cam mechanism, it may be operated by other drive source, for example, an air cylinder or a separately installed motor which is not directly connected to the ATC drive shaft or the like.

According to the finger opening and closing mechanism of the present invention, the outer shaft gear for opening and closing the claw portions at the front ends of the pair of fingers in the conventional tool exchange device is positioned at the external side of the pivoting shaft of the tool exchange arm main body. Therefore, the diameter of the outer shaft gear is increased and the length in the axial direction is shortened whereby the strength in respect of torsion is increased and an excessive pivoting is not needed by which tool exchange time can be shortened. Further, the fitted diameter is large and therefore, plane pressure is reduced and a large torque is obtained.

What is claimed is:

1. A finger opening and closing mechanism of a tool exchange device for exchanging tools between a spindle and a tool magazine of a machine tool, said finger opening and closing mechanism comprising:

a pivoting shaft parallel to the spindle;

a tool exchange arm connected with a lower end portion of the pivoting shaft;

at least one pair of fingers that releasably holds a tool, said pair of fingers being connected to the tool exchange arm;

a finger driving cam that opens and closes the pair of fingers;

a finger driving cam shaft fixed with the finger driving cam;

an outer shaft gear arranged at an outer periphery of the pivoting shaft that rotates the finger driving cam shaft; and a tool exchange drive shaft that pivots the outer shaft gear.

2. The finger opening and closing mechanism according to claim 1, wherein a drive force transmitting portion of the tool exchange drive shaft and the outer shaft gear is arranged adjacent a tool exchange arm main body.

3. A finger opening and closing mechanism according to claim 1, wherein the at least one pair of fingers comprises a plurality of pairs of fingers provided on the tool exchange arm.

4. The finger opening and closing mechanism according to claim 1, further comprising a biasing member mounted to each pair of fingers that biases gripper jaws at front ends of each pair of fingers in one of a closing direction and an opening direction of gripper jaws.

5. The finger opening and closing mechanism according to claim 1, further comprising a driven portion provided at a base portion of each respective finger in each pair of fingers that is brought into contact with the finger driving cam for opening and closing each finger.

6. The finger opening and closing mechanism according to claim 5, further comprising a projecting portion provided at a base portion of each finger where each driven portion is provided, are an engaging portion provided at each base portion of the other fingers that is brought into contact with each projecting portion.

7. The finger opening and closing mechanism according to claim 1, further comprising fitted portions that connect and disconnect the outer shaft gear and the finger driving cam.

8. The finger opening and closing mechanism according to claim 7, wherein said fitted portions include at least one projection provided on one of the outer shaft gear and the finger driving cam shaft and at least one recess provided on the other of the outer shaft gear and the finger driving cam shaft.

9. The finger opening and closing mechanism according to claim 8, wherein the projection and the recess are selectively engageable depending on an axial position of the pivoting shaft.

10. A mechanism for exchanging a tool between a spindle and a tool magazine of a machine tool, comprising:

a pivoting shaft having an upper end and a lower end, the lower end having a first engagement member;

a tool exchange arm on the lower end of the pivoting shaft, the tool exchange arm including at least one pair of fingers that releasably grasps a tool;

a finger driving cam shaft that rotates the pair of fingers, the finger driving cam shaft having a second engagement member that engages the first engagement member during pivoting movement of the pivoting shaft;

an outer shaft gear disposed adjacent the lower end of the pivoting shaft; and a segment gear associated with a tool exchange drive shaft that rotates the outer shaft gear.

11. The mechanism according to claim 10, wherein the first engagement member is a recess and the second engagement member is a projection that engages with the recess.

12. The mechanism according to claim 10, further comprising a device connected to the pivoting shaft between the upper and lower ends thereof that axially reciprocates the pivoting shaft.

13. A mechanism for exchanging a tool between a spindle and a tool magazine of a machine tool, comprising:

a pivoting shaft having an upper end and a lower end, the lower end having a first engagement member;

a tool exchange arm on the lower end of the pivoting shaft, the tool exchange arm including at least one pair of fingers that releasably grasps a tool;

a finger driving cam shaft that rotates the pair of fingers, the finger driving cam shaft having a second engagement member that engages the first engagement member during pivoting movement of the pivoting shaft; and a device connected to the pivoting shaft between the upper and lower ends thereof that axially reciprocates the pivoting shaft.

14. The mechanism according to claim 13, further comprising:

an outer shaft gear disposed adjacent the pivoting shaft; and a segment gear associated with a tool exchange drive shaft that rotates the outer shaft gear.

* * * * *